Figure 1:
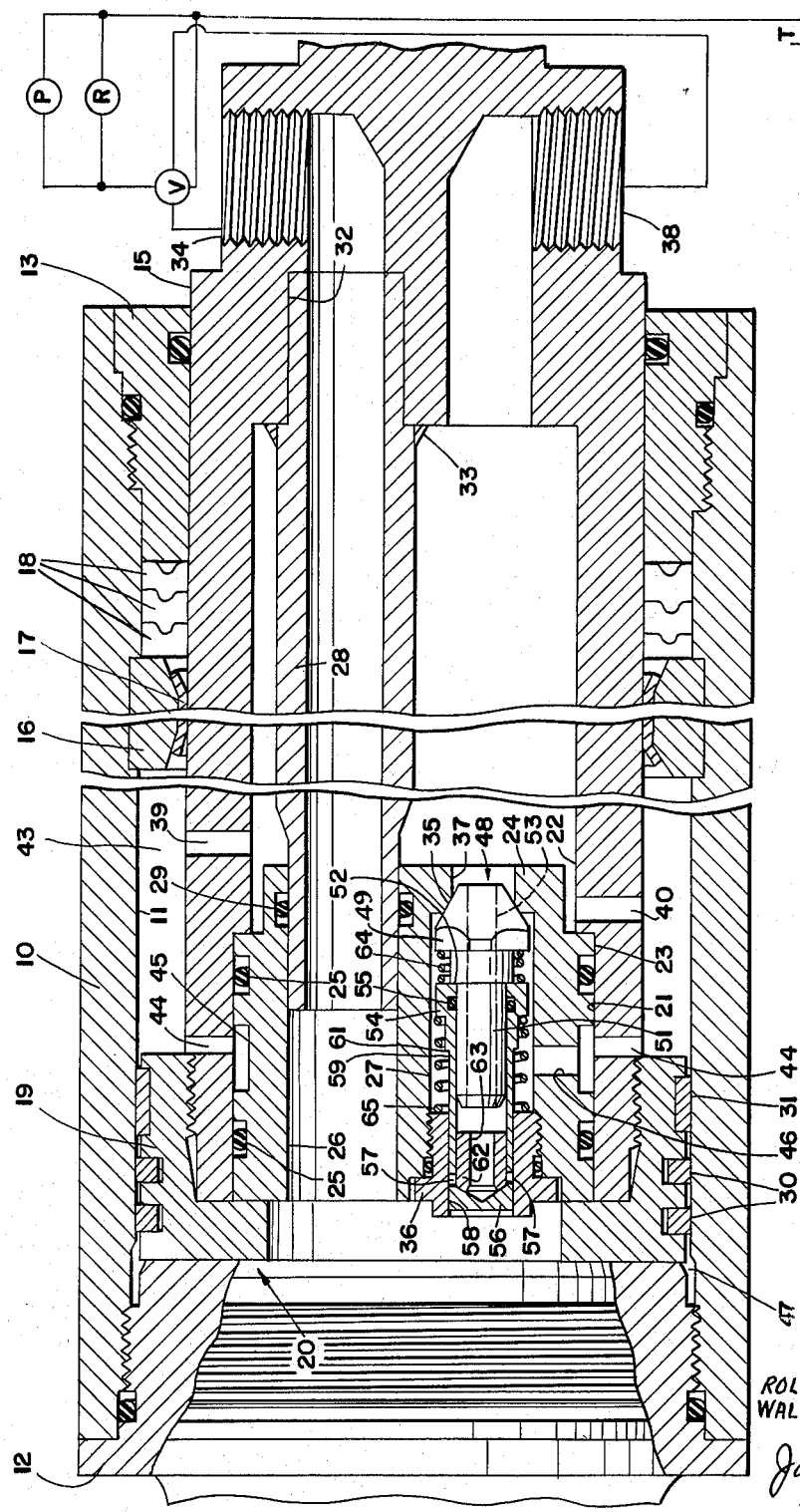

INVENTORS
ROLF A. MADLAND
WALTER W. DAVIS

John N. Wolfram
ATTORNEY

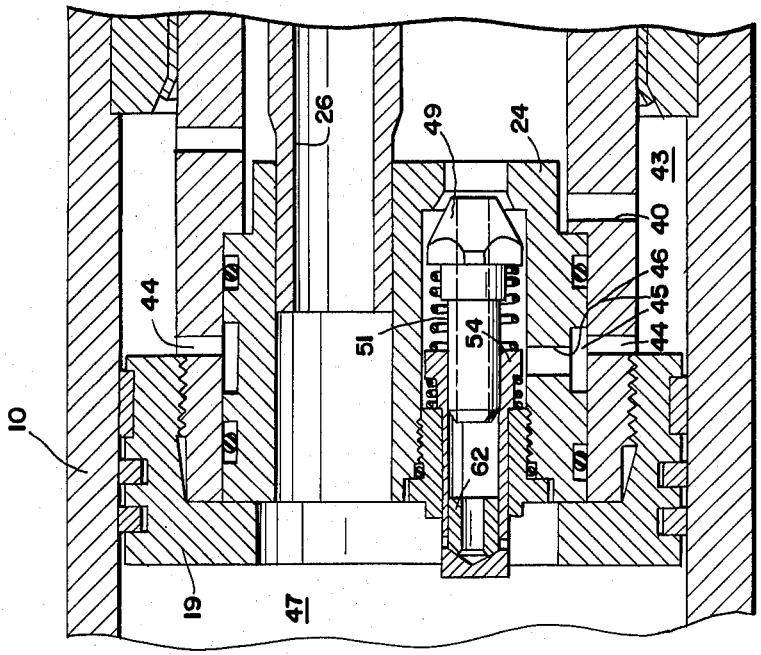
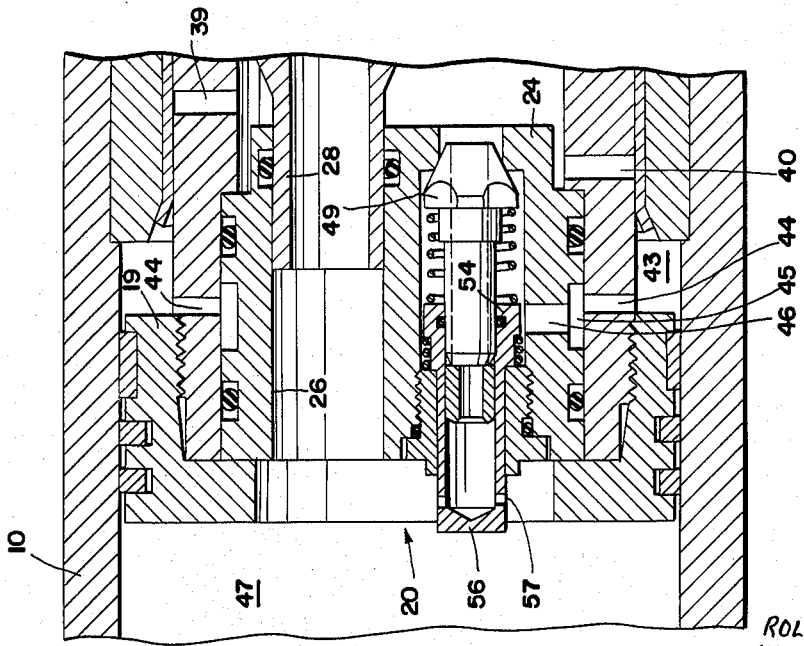

United States Patent Office 3,259,026
Patented July 5, 1966

1

3,259,026
FLUID PRESSURE MOTOR WITH UNLOADING
VALVE
Rolf A. Madland, Arlington Heights, and Walter W. Davis, Palatine, Ill., assignors to Parker-Hannifin Corporation, Cleveland, Ohio, a corporation of Ohio
Filed Nov. 5, 1964, Ser. No. 409,112
15 Claims. (Cl. 91—26)

This invention relates to fluid pressure motors having a cushioning chamber and an unloading valve whereby pump pressure to the motor is unloaded when pressure in the cushioning chamber reaches a predetermined value.

In fluid motors it is common practice to provide a means for utilizing fluid to cushion the stopping of the piston when it reaches the end of its stroke. One disadvantage in this type of cushioning is that with a fixed displacement pump, the pressure of the fluid supplied to the motor rises rapidly as the cushioning effect begins and the pump output must be discharged over a relief valve to prevent the pressure from becoming excessively high. Also, because of the differential piston areas subject to fluid pressures, the pressure in the cushioning chamber tends to become much higher than the supply pressure. It is desirable to keep this pressure within reasonable limits.

The present invention normally prevents the fluid pressure supplied by a fixed displacement pump from becoming high enough to actuate the system relief valve during cushioning and also limits the pressure developed within the cushioning chamber. It accomplishes this by bypassing the pump pressure to the low pressure side of the motor when the cushioning pressure reaches a predetermined value. Bypassing the pump pressure in this manner prevents the same from increasing further and also prevents a further increase of pressure in the cushioning chamber.

A full understanding of the invention, its construction and mode of operation, will be apparent from the following description and from the drawings in which:

FIGURE 1 is a cross section view of a cylinder type fluid pressure motor with the parts in position for extending the piston rod, FIGURE 2 is a fragmentary cross section view of the motor when the piston is in cushion, and FIGURE 3 is a fragmentary cross section view of the motor when the piston rod is retracting.

The fluid pressure motor has a cylinder body 10 having a bore 11 closed at one end by a cap 12 and closed at the other end by a bushing 13 having a cylindrical opening 14 through which piston rod 15 extends. Also mounted within bore 11 and anchored endwise with respect to cylinder body 10 is a stop ring 16 having a liner 17 of low friction material. A series of packing rings 18 between stop ring 16 and bushing 13 seal against cylinder body 10 and piston rod 15.

Piston rod 15 is threaded to piston member 19 and the latter carries suitable packing rings 30, 31 for sealing against cylinder bore 11.

Piston rod 15 has a bore 21 and a counterbore 22 extending from one end with a shoulder 23 therebetween. Mounted within bore 21 and in engagement with shoulder 23 is a cylindrical plug 24, the plug being sealed within bore 21 by packings 25 and retained therein by piston member 19 and constitutes with the latter a piston generally designated 20.

Plug 24 has a pair of bores 26, 27 therethrough, a transfer tube 28 at one end extending within bore 26 and sealed therein by packing 29 and the other end extending into a bore 32 at the other end of the piston rod 15 and is welded to the piston rod as at 33. The interior of tube 28 communicates with a port 34 opened to the exterior of the piston rod and through which fluid for extending the rod may be introduced into first chamber 47 formed between cap 12 and piston 20.

Plug bore 27 constitutes a valve chamber and has a valve seat 35 formed near one end and has a bushing 36 threaded into its other end. Adjacent valve seat 35 is a bore section 37 open to counterbore 22. The latter communicates with a port 38 open to the exterior of piston rod 15 and through which fluid for retracting the piston rod may be introduced.

Piston rod 15 has a plurality of holes 39, 40 preferably axially offset as shown for connecting counterbore 22 with a second chamber 43 on one side of piston member 19. Rod 15 also has a plurality of radial holes 44 connecting chamber 43 with an annular groove 45 formed in plug 24 which in turn is connected to a bore 27 by a radial opening 46.

Mounted within bore 27 is an unloading valve assembly generally designated 48 and which includes a first valve member 49 engageable with seat 35 and having a cylindrical extension 51 terminating in a shoulder 52. A bore 53 extends through valve member 49. Mounted for sliding movement on extension 51 is a hollow second valve member 54 sealed by a packing 55 and having a closed end 56 and radial openings 57. Adjacent its closed end valve member 54 has a close sliding fit within bore 58 of bushing 36. Intermediate its ends valve member 54 has a cylindrical portion 59 terminating at a shoulder 61. Mounted within valve member 54 is a sleeve valve 62 having an opening 63 therethrough. A spring 64 is interposed between valve member 54 and valve member 49 and another spring 65 bears against bushing 36 and valve member 54. Spring 65 is stronger than spring 64 so that in the normal position of the parts valve member 54 will bear against shoulder 52 and urge valve member 49 into closed position on seat 35.

Operation

To actuate the fluid motor, fluid under pressure from pump P is introduced through a first passage constituted by port 34, the interior of tube 28 and bore 26 to first chamber 47 where it acts on the adjacent end of piston 20 and causes piston rod 15 to move toward extended position. At this time, fluid within second chamber 43 is expelled through a second passage constituted by holes 39, 40, counterbore 22 and port 38 to tank T. Also at this time fluid from chamber 43 has access to bore 27 via hole 44, groove 45 and opening 46, but the pressure of this fluid is low and insufficient for causing any movement of valve member 54 against the high pressure fluid within chamber 47 acting upon the outer end 56 of valve member 54.

As the piston rod extends, holes 39, 40 will pass within liner 17 to substantially restrict the flow of fluid therethrough from chamber 43 and causing the pressure of fluid within chamber 43 to rise and provide a cushioning action for slowing down the travel of the piston rod whereby it will come to a gentle stop when piston 19 contacts stop ring 16. Since the effective area of piston 19 subject to the pumping pressure within chamber 47 is much greater than the area of piston 19 exposed to chamber 43, the pressure in chamber 43 during the cushioning part of the stroke could build up to a value many times that of the pumping pressure if the unloading valve assembly 48 is not provided. To accommodate such extremely high pressure in chamber 43 it will be necessary to provide a heavier wall for cylinder body 10 and it would also be more difficult for packings 18 to seal against external leakage and bushing 13 would be subjected to greater axial loading.

When the pressure within chamber 43 has reached a predetermined value, as for example 1.6 times the pressure in chamber 47, the pressure of this fluid communicated to bore 27 as aforesaid and acting upon the inner end of valve member 54 becomes sufficient to overcome spring 65 and the pressure of fluid in chamber 47 acting upon closed end 56 of the valve member and cause the latter to move to the position shown in FIGURE 2. It may be noted that to bring about this movement, the effective area of the inner end of valve member 54 upon which the fluid acts is equal to the diameter of bore 58 less the diameter of sleeve 51.

When valve member 54 has moved to the position shown in FIGURE 2, radial openings 57 are exposed to chamber 47 to unseat sleeve valve 62 to move the latter against extension 51 of poppet 49 and permit fluid from chamber 47 to pass through poppet bore 53 to mix with the low pressure fluid within counterbore 22 and be returned to the tank. Such bypassing of fluid from chamber 47 to the tank normally prevents the pump output pressure from becoming high enough to cause relief valve R to operate and also prevents further rise of pressure within chamber 43.

To retract the piston rod, valve V is operated to connect pump P with port 38 and to connect port 34 with tank T. Fluid under pressure then enters port 38 and counterbore 22. Since ports 39 and 40 are substantially closed by liner 17 at the beginning of the retraction stroke, the fluid under pressure in counterbore 22 acts upon valve member 49 to move the latter away from its seat 35 to permit flow from counterbore 22 past valve member 49 and through opening 46, groove 45, hole 44 into chamber 43 for acting on piston 19 to retract piston rod 15. At this time fluid from counterbore 22 also enters valve member bore 53 to move sleeve valve 62 to its seated position, as shown in FIGURE 3 for closing radial openings 57. Upon completion of the retraction stroke, valve V is again actuated to its position for introducing pump discharge fluid into port 34 and for connecting port 38 to tank T. At this time springs 64, 65 return the unloading valve parts to their positions as shown in FIGURE 1.

Although only one embodiment of the invention has been illustrated and described, it is obvious that various changes in the detail arrangement may be made within the scope of the invention as defined by the claims.

I claim:

1. In a fluid pressure motor, a hollow body, a movable wall forming first and second chambers within said body, a first passage for conducting fluid to and from the first chamber, a second passage for conducting fluid to and from the second chamber, cooperating means carried by the movable wall and the body for trapping fluid within said second chamber when the wall is near one end of its travel for cushioning the movement of the wall, a valve chamber containing valve means, a third passage connecting the first chamber with the second passage, a fourth passage connecting the second chamber with the valve chamber, said valve means having areas subject to fluid pressures in said chambers and second passage such that the valve means closes said third passage when fluid pressure in said first chamber is greater than that in the second chamber, opens communication between the first chamber and the second passage when the pressure of fluid in the second chamber exceeds that in the first chamber and opens communication between the second passage and second chamber when the fluid pressure in the second passage exceeds that in the second chamber.

2. The fluid motor of claim 1 in which said third and fourth passages are in said movable wall.

3. The fluid motor of claim 1 in which said valve means is spring urged toward its position for closing communication between said first chamber and said second passage.

4. The fluid motor of claim 1 in which the movable wall has a greater area exposed to fluid in said first chamber than exposed to fluid in the second chamber.

5. In a fluid motor, a body having a bore and closure means for each end of the bore, a piston rod extending through one of the closure means, a piston carried by the rod and dividing the bore into first and second chambers, a first passage for conducting fluid to and from the first chamber, a second passage for conducting fluid to and from the second chamber, said second passage including a central chamber in said rod and a radial opening in said rod connecting the central chamber with said second chamber, said piston including a portion closing one end of said central chamber, a valve chamber in said portion containing valve means, a third passage in said portion connecting the central chamber with said first chamber, a fourth passage connecting said second chamber with said valve chamber, said valve means having areas subject to fluid pressures in said chambers such that the valve means closes said third passage when fluid pressure in the first chamber is greater than that in the second chamber, opens communication between the first and central chambers when the pressure of fluid in the second chamber exceeds that in the first chamber and opens communication between said central and second chambers when the pressure of fluid in the central chamber exceeds that in the second chamber.

6. The fluid motor of claim 5 in which said piston portion is retained in position for closing said central chamber by another piston portion attached to said rod.

7. The fluid motor of claim 5 in which said first passage passes through said piston portion to connect said first chamber with an externally opening port in said rod.

8. The fluid motor of claim 5 in which said first passage includes an externally opening port in said rod, a tube leading from the port through said central chamber to said piston portion and a passage through said piston portion to said first chamber.

9. In a fluid motor, a hollow body, a movable wall forming first and second chambers within said body, a first passage for conducting fluid to and from the first chamber, a second passage for conducting fluid to and from the second chamber, a valve chamber, a third passage connecting the first chamber with said second passage, a fourth passage connecting the valve chamber with said second chamber, a first valve member in said valve chamber for controlling flow of fluid between said second and fourth passages through said third passage and movable to open position by pressure of fluid in said second passage, a second valve member in said valve chamber for controlling flow of fluid from the first chamber to said second passage, said second valve member being exposed to fluid from said second chamber and said first chamber and movable to open position when the pressure of fluid in said second chamber exceeds that in the first chamber.

10. The fluid motor of claim 9 in which both of said valve members are spring pressed toward closed position.

11. The fluid motor of claim 9 in which said first and second valve members have a telescopic relation and have communicating interior passages for conducting fluid from the first chamber to the second passage when the second valve member is in open position.

12. The fluid motor of claim 11 in which said second valve member has a radial passage for connecting the first chamber to said interior passages when the second valve member is in open position, and a sleeve valve within said second valve member movable by fluid pressure from said second passage for closing said radial passage when fluid pressure in said second passage exceeds that in said first chamber.

13. In a fluid motor, a hollow body, a movable wall forming first and second chambers within said body, a first passage for conducting fluid to and from the first chamber, a second passage for conducting fluid to and from the second chamber, a valve chamber, a third passage connecting the first chamber and said second passage, a fourth passage connecting the valve chamber with the second chamber, a first valve member in the valve chamber for controlling flow of fluid between the second and fourth passages through said third passage, said first valve member having a cylindrical extension and a first bore therethrough, a second valve member slidably mounted on said extension and having a second bore open to said first bore, said second valve member also having a sliding fit within a portion of the wall of said third passage and having a radial opening connecting the second bore with the first chamber when said second valve member is in open position, said radial opening being closed by the third passage wall when the second valve member is in closed position, a sleeve valve within said second bore for opening and closing said radial opening and having a central opening therethrough, said first valve member being openable and said sleeve valve being closable by pressure of fluid within said second passage when such pressure exceeds that in said first chamber, said second valve member being openable by pressure of fluid within said second chamber when such pressure exceeds that in said first chamber and that in said second passage, and said sleeve valve being openable by pressure of fluid in said first chamber when said second valve member is in open position and the pressure in said first chamber exceeds that of the second passage.

14. The fluid motor of claim 13 in which there is a shoulder on said first valve member engageable by the second valve member and there is a first spring urging the second valve member against said shoulder and urging both said first and second valve members toward their closed positions.

15. The fluid motor of claim 14 in which there is a second spring between the first and second valve members urging the second valve member in a direction away from said shoulder, said first spring being stronger than said second spring, said second spring serving to maintain said first valve member closed when said second valve member is open and fluid pressure in said second passage does not exceed that in the second chamber.

References Cited by the Examiner
UNITED STATES PATENTS
3,182,563  5/1965  Nielan _____ 91—401

SAMUEL LEVINE, *Primary Examiner.*

P. T. COBRIN, *Assistant Examiner.*